United States Patent
Wendler (10) Patent No.: US 10,068,348 B2
(45) Date of Patent: Sep. 4, 2018

(54) METHOD AND APPARATUS FOR INDENTIFYING STRUCTURAL ELEMENTS OF A PROJECTED STRUCTURAL PATTERN IN CAMERA IMAGES

(71) Applicant: PILZ GMBH & CO. KG, Ostfildern (DE)

(72) Inventor: Martin Wendler, Ostfildern (DE)

(73) Assignee: PILZ GMBH & CO. KG, Ostfildern (DE)

( * ) Notice: Subject to any disclaimer, the term of this patent is extended or adjusted under 35 U.S.C. 154(b) by 6 days.

(21) Appl. No.: 15/448,922

(22) Filed: Mar. 3, 2017

(65) Prior Publication Data

US 2017/0178354 A1    Jun. 22, 2017

Related U.S. Application Data

(63) Continuation of application No. PCT/EP2015/068377, filed on Aug. 10, 2015.

(30) Foreign Application Priority Data

Sep. 17, 2014 (DE) .......................... 10 2014 113 389

(51) Int. Cl.
*G06K 9/00* (2006.01)
*G06T 7/593* (2017.01)
(Continued)

(52) U.S. Cl.
CPC .............. *G06T 7/593* (2017.01); *G06T 7/521* (2017.01); *G06T 7/85* (2017.01); *H04N 13/0242* (2013.01);
(Continued)

(58) Field of Classification Search
CPC ............ G01B 11/2545; G01B 11/2513; G01B 11/002; G01B 11/25; G01B 11/2531;
(Continued)

(56) References Cited

U.S. PATENT DOCUMENTS 6,341,016 B1 * 1/2002 Malione ............. G01B 11/2509
345/419
6,466,305 B1   10/2002 McBain
(Continued)

FOREIGN PATENT DOCUMENTS

DE            195 02 459 A1    8/1996
DE       10 2004 020 419 B3   10/2005
(Continued)

OTHER PUBLICATIONS

English translation of International Preliminary Report on Patentability (Chapter I) for PCT/EP2015/068377; dated Mar. 30, 2017; 10 pp.
(Continued)

*Primary Examiner* — Li Liu
(74) *Attorney, Agent, or Firm* — Harness, Dickey & Pierce, P.L.C.

(57) ABSTRACT

A method for identifying in camera images individual structural elements of a structural pattern projected by a projector onto a scene. First and second cameras are used to pick up the structural pattern. The cameras are positioned at a distance from one another, and the projector is positioned outside a straight line connecting the two cameras and at a distance from the cameras. With respect to a particular structural element to be identified in the camera image of the first camera, the structural element in the camera image of the second camera which can be associated one-to-one with the particular structural element is determined by way of calibration data. The calibration data for the individual structural elements comprises combinations of parameters which correlate the respective structural element with the location and orientation of both the first camera and the projector, and of the second camera and the projector.

21 Claims, 7 Drawing Sheets

(51) Int. Cl.
*G06T 7/80* (2017.01)
*G06T 7/521* (2017.01)
*H04N 13/02* (2006.01)

(52) U.S. Cl.
CPC .............. *H04N 13/0253* (2013.01); *G06T 2207/10012* (2013.01); *G06T 2207/30108* (2013.01); *G06T 2207/30232* (2013.01)

(58) Field of Classification Search
CPC ... G01B 2210/146; G06T 7/521; G06T 7/593; G06T 2207/10012; G06T 2207/30108; G06T 2207/30232; G06T 7/85; H04N 13/0242; G06K 9/00201; G06K 9/62
See application file for complete search history.

(56) References Cited

U.S. PATENT DOCUMENTS

| | | | |
|---|---|---|---|
| 9,928,420 B2* | 3/2018 | Kirk | H04N 5/33 |
| 2005/0238237 A1 | 10/2005 | Haeusler et al. | |
| 2007/0124949 A1* | 6/2007 | Burns, Jr. | G01B 11/2509 33/288 |
| 2008/0201101 A1 | 8/2008 | Hebert et al. | |
| 2009/0067749 A1* | 3/2009 | Schiewe | H04N 9/3185 382/294 |
| 2009/0116742 A1* | 5/2009 | Nishihara | G06F 3/0418 382/173 |
| 2014/0067317 A1* | 3/2014 | Kobayashi | B25J 9/1697 702/153 |
| 2014/0168379 A1 | 6/2014 | Heidemann et al. | |
| 2014/0368614 A1* | 12/2014 | Imai | H04N 13/0246 348/47 |
| 2015/0015701 A1* | 1/2015 | Yu | H04N 5/2259 348/136 |
| 2015/0381972 A1* | 12/2015 | Kowdle | H04N 9/3191 348/51 |
| 2016/0000516 A1* | 1/2016 | Cheng | A61B 34/20 600/424 |
| 2017/0115008 A1* | 4/2017 | Erbe | F24C 7/081 |
| 2017/0205495 A1* | 7/2017 | Braker | G01S 7/4814 |

FOREIGN PATENT DOCUMENTS

| | | |
|---|---|---|
| DE | 10 2007 036 129 B3 | 9/2008 |
| DE | 20 2008 017 729 U1 | 7/2010 |
| DE | 10 2012 023 623 A1 | 6/2014 |
| DE | 10 2012 112 321 A1 | 7/2014 |
| EP | 1 649 423 | 2/2005 |
| EP | 2 019 281 A1 | 1/2009 |
| EP | 2 133 619 A1 | 12/2009 |
| EP | 2 568 253 A1 | 3/2013 |
| WO | WO 2013/145665 A1 | 10/2013 |

OTHER PUBLICATIONS

International Search Report for PCT/EP2015/068377, dated Nov. 10, 2015; 3 pp.
Joaquim Salvi et al.; Pattern codification strategies in structured light systems; Oct. 2, 2003; pp. 827-849.
Rongqian Yang et al.; Flexible and accurate implementation of a binocular structured light system; Dec. 20, 2007; pp. 373-379.
C. Sinlapeecheewa et al.; 3D Profile Measurement by Color Pattern Projection and System Calibration; pp. 405-410.

* cited by examiner

METHOD AND APPARATUS FOR INDENTIFYING STRUCTURAL ELEMENTS OF A PROJECTED STRUCTURAL PATTERN IN CAMERA IMAGES

CROSS-REFERENCES TO RELATED APPLICATIONS

This application is a continuation of international patent application PCT/EP2015/068377, filed on Aug. 10, 2015 designating the U.S., which international patent application has been published in German language and claims priority from German patent application No. 10 2014 113 289.7, filed on Sep. 17, 2014. The entire contents of these priority applications are incorporated herein by reference.

BACKGROUND OF THE INVENTION

The invention relates to a method for identifying structural elements of a structural pattern, which is projected onto a scene, in camera images.

The invention furthermore relates to an apparatus for identifying structural elements of a structural pattern, which is projected onto a scene, in camera images, in particular for performing the above-mentioned method.

The invention additionally relates to the use of a previously mentioned method and/or a previously mentioned apparatus for monitoring, in particular securing, a danger zone, in particular a danger zone of a machine, such as a press or a robot.

In the context of the present invention, a scene is understood to mean in particular a three-dimensional danger zone that is monitored by the cameras. Moving objects, such as people, may be present in the scene. In the latter case in particular, cameras monitor the scene as to whether a person or a body part thereof is located in or approaches a dangerous proximity to a machine which operates in automated fashion.

In order to monitor danger zones, in particular danger zones of machines and industrial plants, it is known to use cameras, as is described in EP 2 133 619 A1. Here, a 3D security camera is disclosed, which has a first and a second image sensor, which can each generate image data of the spatial region. The 3D security camera operates together with a projector, which generates a structured illumination pattern in the scene, i.e. in the spatial region. According to the stereoscopy principle, an evaluation unit generates from the image data a depth map of the spatial region, which is monitored for inadmissible intrusions in the spatial region.

During the stereoscopic evaluation of image pairs of a stereo camera, measurement errors can occur due to low-contrast objects or repeating structures within the monitored spatial region. For this reason, as described in the aforementioned document, a structural pattern is projected into the field of vision of the cameras in order to improve the contrast in the camera images. It is advantageous here to use structural patterns in the form of periodic dot patterns, as are likewise already disclosed in the aforementioned document. Structural patterns in the form of dot patterns have the advantage over more complex structural patterns that they are sharply delineated and that less illumination energy is necessary for projecting them.

A projected structural pattern within the context of the present invention is an optical structural pattern, in other words a pattern which consists of light spots.

However, a problem arises when using dot patterns, in particular homogeneous dot patterns, as structural patterns in that erroneous assignments of dots in the camera images to the dots projected in the into the scene frequently occur. This is because the location of one projected structural element in the images of the cameras generally depends on the current distance of the projected structural element from the cameras and likewise on the geometry of the object onto which the structural element is projected. In other words, the location of a structural element in the camera images can vary in dependence on the distance and the object geometry, and can generally differ in the cameras.

An erroneous assignment of dots in the camera images to the dots projected onto the scene results in an erroneous determination of the distance from an object within the scene. An erroneous distance measurement in turn has the effect that dangerous situations can arise if, for example, an object which is located in the danger zone is deemed by the cameras to be outside the danger zone, or of insufficient availability, for example of a machine within the danger zone, if an object is located outside the danger zone, but is deemed by the cameras to be inside the danger zone due to an erroneous distance measurement, and the machine is therefore switched off.

A solution to the problem of the erroneous assignment of structural elements in the camera images to the structural elements projected onto the scene according to EP 2 019 281 A1 is that of projecting more complex structural patterns onto the scene that are, at least in partial regions, inhomogeneous, aperiodic and non-self-similar. However, the generation of such more complex structural patterns is disadvantageous in light of the high outlay in terms of apparatus, i.e. the complexity of the projector.

WO 2013/145665 A1 discloses an apparatus for three-dimensional measurement, which projects light lines from a projector onto a workpiece, wherein a stereo camera picks up an image of the workpiece onto which the light lines are projected. A control apparatus of the apparatus temporarily identifies a correspondence between a bright line in a first image of the picked-up stereo image and a light section plane, and projects the bright line onto the light section plane. The bright line, which is projected onto the light section plane, is projected onto a second image. The control apparatus calculates the degree of similarity between a bright line, which is projected onto the second image, and a bright line in the second image, and determines the result of the identified correspondence relationship between the projected bright line and the bright line in the second image.

US 2008/0201101 A1 discloses a handheld three-dimensional scanner for scanning and digitizing the surface geometry of items.

DE 20 2008 017 729 U1 discloses a 3D security camera for monitoring and securing a spatial region. The security camera has an illumination unit having at least one semiconductor light source. The semiconductor light source generates a high optical output of at least 10 W, which permits generation of a dense depth map for a reliable evaluation independent of fluctuations in the ambient light in the monitored spatial region.

DE 10 2004 020 419 B3 discloses an apparatus for measuring even strongly curved reflective surfaces. Patterns which are reflected at the surface are observed here and evaluated. The reflected patterns are observed from multiple directions. Evaluation is effected by determining those sites within the measurement space at which surface normals determined for the various observation directions have the lowest deviations with respect to one another.

SUMMARY OF THE INVENTION

The invention is based on the object of specifying a method and an apparatus with which structural elements of a structural pattern, which is projected onto a scene, in camera images can be reliably identified.

It is a further object of specifying a method and an apparatus with which structural elements of a structural pattern can be identified without necessitating complex, inhomogeneous, aperiodic, time- or space-coded structural patterns.

According to an aspect, a method of identifying in camera images individual structural elements of a structural pattern projected onto a scene is provided, comprising the steps of:

projecting the structural pattern onto the scene using a projector, picking up the structural pattern projected onto the scene using a first camera and at least one second camera, wherein the first camera and the at least one second camera are positioned at a distance from one another, and wherein the projector is positioned outside a straight connecting line of the first and at least one second camera at a distance from the first camera and from the at least one second camera, determining, with respect to a structural element that is to be identified in a camera image of the first camera, that structural element in a camera image of the at least one second camera which can be associated one-to-one with the structural element that is to be identified in the camera image of the first camera, wherein the step of determining comprises using calibration data obtained by way of recording calibration images of the structural pattern projected by the projector and using the first and the at least one second camera, wherein the calibration data has, in relation to the individual structural elements, respective combinations of first parameters correlating the individual structural elements with a location and orientation of the first camera and of the projector, and of at least second parameters correlating the individual structural elements with a location and orientation of the at least one second camera and of the projector.

Furthermore provided, according to an aspect, is an apparatus for identifying in camera images structural elements of a structural pattern projected onto a scene, comprising:

a projector configured to project the structural pattern onto the scene, a first camera for picking up the structural pattern projected onto the scene, at least one second camera for picking up the structural pattern projected onto the scene, wherein the first camera and the at least one second camera are positioned at a distance from one another, and wherein the projector is positioned outside a straight connecting line of the first and at least one second camera at a distance from the first camera and from the at least one second camera, a storage unit in which calibration data is stored, the calibration data having, in relation to the individual structural elements, respective combinations of first parameters correlating the individual structural elements with a location and orientation of the first camera and of the projector, and of at least second parameters correlating the individual structural elements with a location and orientation of the at least one second camera and of the projector, and a calculation unit configured to determine, using the calibration data, with respect to a structural element that is to be identified in a camera image of the first camera, that structural element in a camera image of the at least one second camera which can be associated one-to-one with the structural element that is to be identified in the camera image of the first camera.

The term "camera" in the context of the present invention is intended to have a general meaning. A camera can be understood to mean, for example, merely an image sensor with associated optics. First camera and at least second camera are also intended to mean that two image sensors are accommodated in a common housing with a lateral distance from one another, wherein the image sensors can be assigned a common imaging optics or a separate imaging optics in each case. However, the first camera and the at least one second camera can also be in the form of separate, stand-alone cameras having their own housing and their own imaging optics.

The method according to the invention and the apparatus according to the invention are based on the principle of accurate knowledge of the location and orientation of the projector, for example the exit pupil thereof and the transmission direction for each individual structural element, and of the location and orientation of the at least two cameras, for example location and orientation of the exit pupils thereof and the viewing direction thereof. In order to acquire this accurate knowledge, in the method according to the invention, for example upon the installation of the at least two cameras and the projector, calibration images of the structural pattern are recorded, from which calibration data is obtained. The calibration data has, for the individual structural elements, in each case combinations of first parameters, which correlate the respective structural element with the location and orientation of the first camera and of the projector, and of at least second parameters, which correlate the respective structural element with the location and orientation of the at least one second camera and of the projector. The structural elements of the projected structural pattern are uniquely determined owing to these parameter combinations which are assigned during the calibration to the individual structural elements, preferably to each structural element.

In the apparatus according to the invention, this obtained calibration data is stored in a storage unit. In the method according to the invention, the calibration data is then used in the identification of the structural elements, which are projected onto the scene, of the structural pattern in the camera images of the at least two cameras in order to permit a one-to-one assignment between structural elements in the camera image of the at least one second camera and structural elements in the camera image of the first camera.

The method according to the invention and the apparatus according to the invention permit a reliable assignment of structural elements in the camera images of the first and at least one second camera to the structural elements which are projected onto the scene. With the method according to the invention and the apparatus according to the invention, the basis for a correct measurement of distances from objects in a spatial region to be monitored is established. It is possible herewith for the camera system to reliably assess whether an object is located for example within a danger zone or outside of it.

The location and orientation of the at least two cameras and of the projector with respect to one another is known from the calibration thereof by recording calibration images, and straight lines, what are known as camera epipolar lines, of the at least two cameras are determinable from the known location and orientation of the two cameras with respect to one another. The location and orientation of the projector with respect to the at least two cameras is also known by way of calibration, wherein, based on this knowledge, further straight lines, what are known as illumination epipolar lines of the pairings of the first camera and the projector and of the at least one second camera and the projector are determinable.

In the at least two cameras, the image of a structural element is always located on a respective camera epipolar line. On which camera epipolar line the image of a structural element comes to lie and which other structural elements are also located on said camera epipolar line depends on the geometry and the distance of the object onto which the structural pattern is projected. For each of the at least two cameras, there are many camera epipolar lines.

In addition, each projected structural element and the image thereof in the cameras is located on a respective illumination epipolar line. For each pairing of first camera and the projector and at least second camera and projector, there is a plurality of illumination epipolar lines. For two cameras and a projector that is positioned with respect to the cameras as cited above outside the straight connecting line thereof, there are two sets of illumination epipolar lines which extend obliquely to one another, wherein a first set is assigned to the arrangement of first camera and projector and a second set is assigned to the arrangement of second camera and projector. A projected structural element and the image thereof in the cameras are always located on the same respective illumination epipolar line, independently of the geometry and the distance of an object onto which the structural pattern is projected. At which site on an illumination epipolar line the structural element comes to lie and which other structural elements are also located on this line depends, however, on the geometry and the distance of the object.

Using the above-mentioned circumstances that a structural element and the image thereof are always located on the same illumination epipolar line, independently of the geometry and the distance of an object onto which the structural pattern is projected, the first parameters for the individual structural elements according to a preferred embodiment comprise gradients and points of intersection with a first reference axis of first illumination epipolar lines related to the first camera and the at least second parameters for the individual structural elements comprise gradients and points of intersection with a second reference axis of illumination epipolar lines related to the at least one second camera.

In the apparatus according to the invention, the above-mentioned calibration data is stored in the storage unit, for example in the form of a calibration list.

Utilizing said parameters as calibration data has the advantage of a unique and individual assignability between the projected structural elements and said parameters, and in addition it is possible with this type of the parameters to effect the assignment of the images to the projected structural elements in a simple manner, as will be described in more detail below.

During the calibration of the at least two cameras and of the projector, a determination is therefore made for each structural element in each camera as to on which illumination epipolar line it is located with respect to the first camera and on which illumination epipolar line it is located with respect to the at least one second camera. Since a straight line mathematically speaking is uniquely determined by its gradient and one point, it is sufficient, as intended here, to store for each respective structural element only the gradient and only the point of intersection of the illumination epipolar line with a reference axis, which significantly reduces the storage outlay.

For a higher structural element density of the structural pattern, typically a plurality of structural elements are located on the same illumination epipolar line with respect to in each case one of the at least two cameras. Nevertheless, each structural element is uniquely described by the individual combination of the at least two illumination epipolar lines, i.e. the illumination epipolar lines related to the first camera, and the illumination epipolar lines related to the at least second camera.

The first reference axis, which is mentioned in connection with the above embodiment and with which the first illumination epipolar lines related to the first camera intersect, is preferably a scanning line of the first camera, and the second reference axis with which the second illumination epipolar lines related to the at least one second camera intersect is preferably a scanning line of the at least one second camera.

Said scanning lines can be, for example, the respectively first scanning line of the respective camera.

In a further preferred embodiment of the method, the structural pattern is projected sequentially onto a first surface and a second surface for recording the calibration images, wherein the first and the second surfaces are arranged at a distance from one another in the transmission direction of the projector.

This type of recording of the calibration images and thus of the calibration of the at least two cameras and of the projector may be carried out in a particularly simple fashion and thus gives, in a simple manner, for each structural element of the structural pattern, the illumination epipolar line with respect to the first camera and the illumination epipolar line with respect to the at least one second camera.

The first surface and the second surface are preferably planar surfaces. The calibration becomes particularly simple if the same surface is used as the first surface and the second surface, which surface is initially positioned at a first distance from the cameras and the projector in order to record a first calibration image, and is subsequently positioned at a second distance from the cameras and the projector in order to record a second calibration image. The two calibration images are stored and evaluated to obtain the calibration data.

The method according to the invention can be realized particularly easily if, according to one preferred embodiment of the apparatus, the entrance pupil of the first camera, the entrance pupil of the at least one second camera, and the exit pupil of the projector are located in one plane.

In this embodiment, the geometric ratios are simplified both in the calibration and in the identification of images of structural elements. The distances of the structural elements among one another in the images of the cameras are in this arrangement independent of the distance of the projected structural elements from the cameras, i.e. always the same. An assignment of the structural elements in the calibration images is therefore easily possible. A straight line running through the two positions of a structural element in the at least two calibration images corresponds exactly to the illumination epipolar line for this structural element. Furthermore, all first illumination epipolar lines are parallel to one another, that is to say they have the same gradient and differ merely in terms of their points of intersection with the first reference axis, and all second illumination epipolar lines are parallel with respect to one another, that is to say also have the same gradient and differ merely in terms of their points of intersection with the second reference axis. The range of calibration data and thus necessary storage capacity and computational power is hereby advantageously further reduced.

A further way for helping to simplify the method according to the invention is to arrange an optical axis of the first camera, an optical axis of the at least one second camera, and an optical axis of the projector such that they are parallel with respect to one another.

In this embodiment, the camera epipolar lines of the at least two cameras are parallel with respect to one another and to straight connecting lines of the cameras. They can even be aligned with one another from camera to camera. The scanning lines of the at least two cameras can furthermore be advantageously placed to be parallel or perpendicular to the camera epipolar lines, and the distortion of the camera lenses or of the common camera lens can be easily corrected.

In connection with the above-described configuration of the method, according to which the structural pattern is projected sequentially onto a first surface and a second surface for recording the calibration images, which surfaces are at a distance from one another in the transmission direction of the projector, it is preferred if the surfaces are planar and oriented to be perpendicular to the optical axes of the cameras and of the projector.

Due to the perpendicular orientation of the surfaces, the structural pattern picked up by the at least two cameras is substantially distortion-free.

The aforementioned embodiments simplify not only the calibration, but also the reliable identification of the structural elements, which are projected onto the scene, of the structural pattern in the camera images of the at least two cameras.

In the apparatus, a distance between the first and at least one second camera preferably differs from a distance between the projector and the first camera and from a distance between the projector and the at least one second camera.

The structural element identification in the camera images is further improved hereby. Any break of symmetries in the arrangement of the at least two cameras and of the projector increases the accuracy of the assignment of the structural elements in the camera images to the projected structural elements.

In a further preferred embodiment of the method, pixel coordinates of the structural element which is to be identified in each case in the camera image of the first camera are determined, at least a first parameter is calculated from the pixel coordinates and the calibration data, all structural elements which, possibly within a tolerance band, likewise satisfy the at least one first parameter are read from the calibration data, at least one of the at least second parameters is furthermore read for each of said read structural elements, and the structural element that can be associated one-to-one with the structural element to be identified in the camera image of the first camera is determined in the camera image of the at least one second camera.

In the apparatus according to the invention, the calculation unit is correspondingly set up for performing the aforementioned steps.

The computational outlay for the aforementioned steps in this embodiment of the method is advantageously low, since basically, stored or saved calibration data can be accessed. For a structural element that is to be identified, only the first illumination epipolar line is calculated, on which the structural element to be identified is located. Then, the stored calibration data is accessed in order to perform the one-to-one assignment between structural elements in the image of the at least one second camera to the structural element to be identified in the image of the first camera.

To this end, the structural element that is also located on the correct camera epipolar line, i.e. the point of intersection between the second illumination epipolar line and said camera epipolar line, is selected from the structural elements in the image of the at least one second camera, which are located on the second illumination epipolar lines. This is particularly simple in particular if the camera epipolar lines of the two cameras are parallel with respect one another and are located at the same height.

In one further preferred embodiment of the method, the structural pattern which is projected onto the scene is additionally picked up using a third camera which is positioned outside the straight connecting line of the first and second cameras and outside the straight connecting line of the first camera and the projector and outside the straight connecting line of the second camera and the projector, wherein the calibration data additionally has third parameters which correlate the respective structural element with the location and orientation of the third camera and of the projector.

The apparatus according to the invention accordingly has a third camera for picking up the structural pattern which is projected onto the scene.

Depending on the complexity of the topology of the scene onto which the structural pattern is projected, it may be the case that a specific structural element in one of the at least two cameras is not visible, for example due to obstruction by an edge or a shoulder. In this case, this structural element can then be reliably identified with the third camera in connection with one of the two other cameras. The third camera is also useful with respect to the reliable identification of structural elements if, for example, one of the three cameras looks upon a surface in the scene in a grazing manner.

In a further preferred embodiment of the method, the structural elements are distributed in two main axes, which are preferably perpendicular with respect to one another, uniformly over the structural pattern, wherein with further preference the two main axes of the structural pattern extend obliquely with respect to the straight connecting line of the first and at least one second camera and/or obliquely with respect to the straight connecting line of the projector and the first and the at least one second camera.

A uniform structural pattern has the advantage that the projector can have a simple construction. The arrangement of the main axes of the structural pattern obliquely to the straight connecting line of the at least two cameras and/or to the straight connecting line of the projector and the first and the at least one second camera brings about a break in symmetry, which is advantageous for the reliable identification of the structural elements in the camera images, because ambiguities in the identification are reduced.

The method according to the invention is suitable in particular for an embodiment in which the structural pattern is a dot pattern, in particular a homogeneous dot pattern, and the structural elements are dots.

In the apparatus, the projector is accordingly set up to generate the structural pattern in the form of a dot pattern which is in particular homogeneous.

The use of dot patterns or grids which are in particular homogeneous or periodic has the advantage that such structural patterns can be generated easily and be projected with high intensity.

In a further preferred embodiment of the method, the structural pattern is transmitted in pulsed fashion having a pulse frequency which corresponds to half the image recording frequency of the first and the at least one second camera, and wherein in each case two sequential images which are picked up by the first and at least one second camera are subtracted from one another.

In the apparatus, the projector is accordingly set up to transmit the structural pattern in a pulsed fashion with a pulse frequency which corresponds to half the image frequency of the first and the at least one second camera, and wherein the calculation unit is set up to subtract in each case two images which are picked up sequentially by the first and at least one second camera from one another.

In this embodiment, due to the subtraction of two sequential images which are recorded by the first camera and by the at least one second camera, only the structural elements in the difference camera images remain. In this manner, the structural elements in the camera images can be detected more easily.

In order to further increase contrast, any ambient light except for the wavelength of the projection light can be blocked using a bandpass filter, for example IR bandpass filter. The bandpass filter can be arranged in the one or more optics of the at least two cameras.

The method according to the invention and/or the apparatus according to the invention according to one or more of the above-mentioned embodiments is used preferably for monitoring, in particular securing, a danger zone, in particular a danger zone of a machine.

Further advantages and features can be gathered from the following description and the attached drawings.

It is to be understood that the above-mentioned features and the features which are yet to be explained are usable not only in the respectively stated combination, but also in different combinations or alone, without departing from the scope of the present invention.

BRIEF DESCRIPTION OF THE DRAWINGS

An exemplary embodiment of the invention is illustrated in the drawings and will be described in more detail with reference thereto. In the drawings.

DETAILED DESCRIPTION OF THE INVENTION

Figure 1:
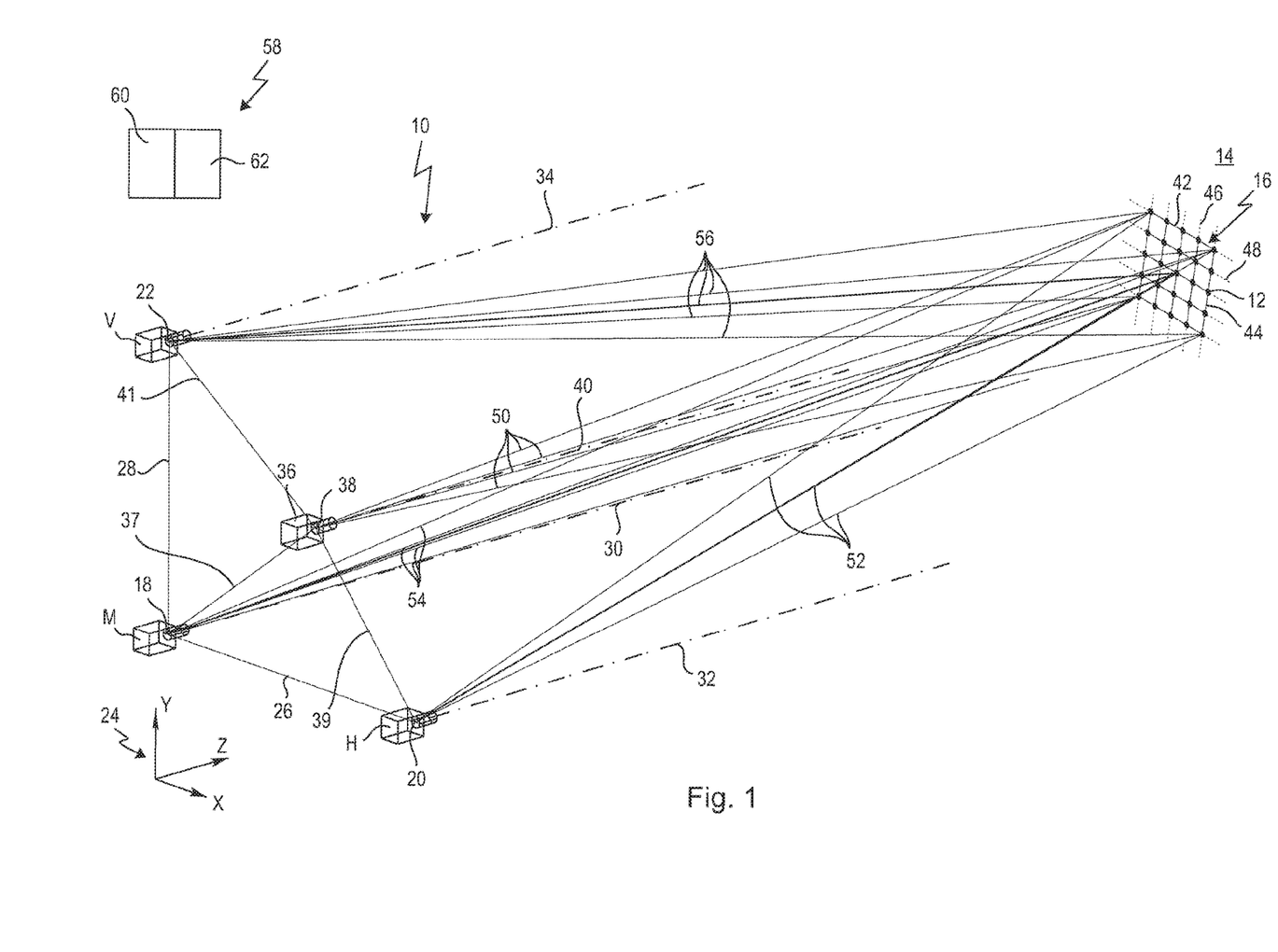
FIG. 1 shows an apparatus for identifying structural elements of a structural pattern, which is projected onto a scene, in camera images.

FIG. 1 shows an apparatus, which is designated with the general reference sign 10, for identifying structural elements 12 of a structural pattern 16, which is projected onto a scene 14, in camera images.

The apparatus 10 is used in particular for monitoring, in particular securing, a danger zone, in particular a danger zone of a machine (not illustrated). The scene 14 is in this case for example a three-dimensional spatial region, in which a machine, in particular a machine operating in automated fashion, such as for example a press or a robot (not illustrated), is located. Generally, moving objects, such as people, can be present in the scene 14, wherein the apparatus 10 monitors the scene 14 as to whether an object is located entirely or partially in, or approaches, the danger zone of the machine that operates in automated fashion.

The apparatus 10 has a first camera M, a second camera H and optionally, while preferred, a third camera V. The cameras M, H, and V are, for example, digital cameras, which each have an optoelectronic image sensor (not illustrated). The image sensors can be configured in CCD or CMOS technology. Such image sensors have a large number of light-sensitive elements (also referred to as pixels), which are arranged in a large number of scanning lines that are arranged parallel with respect to one another.

The cameras M, H and V in each case have an entrance pupil 18, 20 and 22, respectively, which are all arranged in one plane. In FIG. 1, a Cartesian coordinate system 24 having an x-axis, a y-axis and a z-axis is shown for illustrative purposes as a reference system. The above-mentioned plane in which the entrance pupils 18, 20 and 22 of the cameras M, H and V are arranged, in this case is the xy-plane with z=0. The coordinate system 24 as a reference system is designed here such that the entrance pupil 18 of the camera M is located at the coordinates x=0, y=0 and z=0.

One straight connecting line 26 between the camera M and the camera H extends correspondingly in the direction of the x-axis, and a straight connecting line 28 between the camera M and the camera V extents in the direction of the y-axis. The third camera V is thus located outside the straight connecting line 26 between the camera M and the camera H.

The distance between the camera M and the camera H differs from the distance between the camera V and the camera M.

The cameras M, H and V are furthermore positioned and oriented such that their respective optical axis 30 (camera M), 32 (camera H) and 34 (camera V) extend parallel with respect to one another.

The apparatus 10 furthermore has a projector 36 for generating and projecting the structural pattern 16 into the scene 14. The projector 36 can be, for example, in the form of a laser diode with a diffractive optical element, in the form of an LED matrix with imaging optics, in the form of a slide projector, in the form of a spotlight source with facet mirror, or in the form of a digital light processing projector (DLP or DMP projector).

An exit pupil 38 of the projector 36 is located in the same plane as the entrance pupils 18, 20 and 22 of the cameras M, H and V. An optical axis 40 of the projector 36 extends parallel to the optical axes 30, 32 and 34 of the cameras M, H, and V.

The projector 36 is located outside of the straight connecting line 26 between the camera M and the camera H, and also outside of the straight connecting line 28 between the camera M and the camera V. In FIG. 1, straight connecting lines between the cameras M, H and V and the projector 36 are also shown, specifically a straight connecting line 37 between the camera M and the projector 36, a straight connecting line 39 between the camera H and the projector 36, and a straight connecting line 41 between the camera V and the projector 36. As can be seen from FIG. 1, the straight connecting lines 37, 39 and 41 extend obliquely with respect to one another and also with respect to the straight connecting lines 26 and 28.

The structural pattern 16 is a homogeneous dot pattern, that is to say the structural elements 12 are individual dots which are distributed periodically and uniformly along two main axes 42, 44. The main axes 42 and 44 are merely shown here for illustration purposes and do not appear in the structural pattern 16 that is projected in practice. The two main axes 42, 44, which here extend perpendicular with respect to one another, give the two directions of the smallest distances between the dots or of the structural elements 12 of the structural pattern 16.

The structural pattern 16, which is projected by the projector 36, is preferably projected such that the main axes 42 and 44 of the projected structural pattern 16 extend obliquely to the straight connecting lines 26 and 28 and also obliquely to the straight connecting lines 37, 39 and 41.

FIG. 1 shows the structural pattern 16 only in a sectionwise manner having 25 dots or structural elements 12. In practice, the structural pattern 16 has a significantly higher number of structural elements 12, which is here indicated by way of interrupted continuation lines 46 and 48.

The distance between the individual structural elements or dots 12 is preferably 4 to 10 pixels of the image sensors of the cameras M, H and V. The distance to be selected between the individual structural elements 12 of the structural pattern 16 will depend on the accuracy with which the coordinates of a structural element or dot 12 can be determined in the image of the cameras M, H and V.

The structural elements 12 can illuminate only a partial region of the scene 14 imaged in the cameras M, H and V, but typically the opening angle of the illumination coming from the projector 36 is at least as large as the full angle of view or field of view of the cameras M, H and V, with the result that the images in the cameras M, H and V are populated entirely with structural elements 12.

In FIG. 1, individual transmission rays 50 are drawn by way of example for the illumination light that is emitted by the projector 36 and projects the structural pattern 16. Likewise shown by way of example in FIG. 1 are receiving rays 52 for the camera H, receiving rays 54 for the camera M, and receiving rays 56 for the camera V, which start from the individual structural elements 12. As a result, the structural pattern 16 that is projected onto the scene 14 is picked up using the cameras M, H and V.

The apparatus 10 furthermore has a control device 58 having a storage unit 60 and a calculation unit 62. The storage unit 60 and the calculation unit 62 are connected to the cameras M, H and V and to the projector 36 for the purposes of mutual data interchange (not illustrated).

Owing to the arrangement selected here by preference, in which the exit pupil 38 of the projector 36 and the entrance pupils of the cameras M, H and V are located in one common plane perpendicular to the optical axis 30, 32 and 34 of the cameras M, H and V, the structural pattern 16 which is imaged in the cameras M, H and V always appears to be the same size, independently of the distance of the projected structural pattern 16 from the cameras M, H and V. More specifically, the distance between the individual structural elements 12 in the images of the cameras M, H and V does not vary if the distance of the projected structural pattern 16 from the cameras M, H and V varies.

Figure 2:
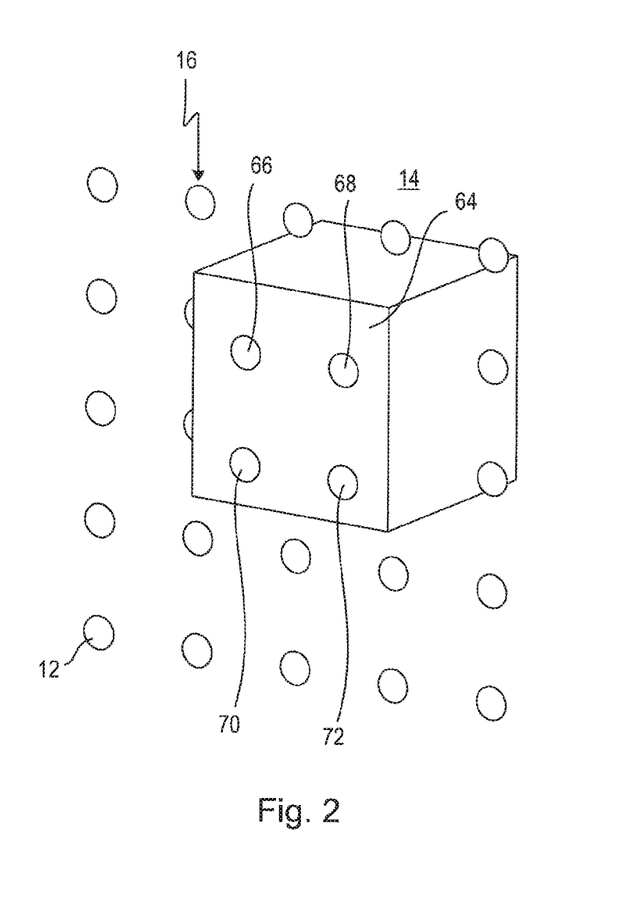
FIG. 2 shows a section of the scene with an object therein.

FIG. 2 shows a section of the scene 14 at a larger scale with respect to FIG. 1 with an object 64 located therein, which is illustrated here in simplified form as a cube. In FIG. 2, four of the structural elements 12 are designated with the reference signs 66, 68, 70 and 72, wherein these structural elements or dots have a shorter distance from the cameras M, H and V than the remaining structural elements 12. Nevertheless, the mutual distance of the structural elements 66, 68, 70 and 72 in the camera images of the cameras M, H and V remains unchanged with respect to a situation in which the object 64 is not present in the scene 14.

A basic principle of the method for identifying the individual structural elements 12 of the structural pattern 16, which is projected onto the scene 14, in the calibration images of the cameras M, H and V lies in the exact knowledge of the location and orientation of the projector 36, i.e. the transmission site of the projection light and the transmission direction for each individual structural element 12, and on the location and orientation of the cameras M, H and V, i.e. the receiving site and the receiving direction of the light rays which come from the individual structural elements 12. To this end, calibration images are recorded, as will be described below with reference to FIGS. 3 to 6.

The calibration images are recorded with unchanging arrangement of the cameras M, H and V and of the projector 36, that is to say having the same locations and orientations of the cameras M, H and V and of the projector 36, as is the case later in the method for identifying the structural elements 12, which are projected onto the scene 14, in the images of the cameras M, H and V.

Figure 3:
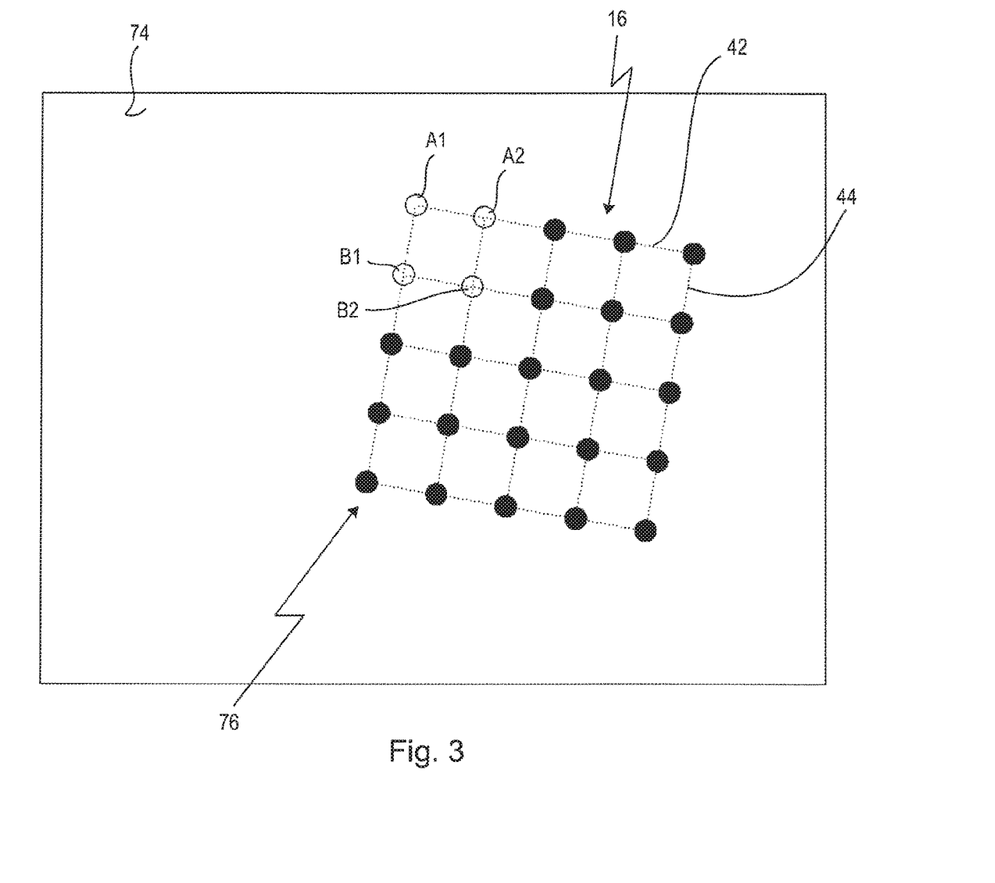
FIG. 3 shows a first calibration image which was recorded in the course of a calibration of the apparatus in FIG. 1.

First, a first calibration image is recorded using the cameras M, H and V, wherein the structural pattern 16 is projected by the projector 36 onto a planar surface at a first distance from the cameras M, H and V and from the projector 36. By way of example, FIG. 3 shows, for the camera M, an image surface 74 of the image sensor of the camera M, with which the structural pattern 16, which is projected onto the first planar surface, is recorded as a calibration image 76.

Figure 4:
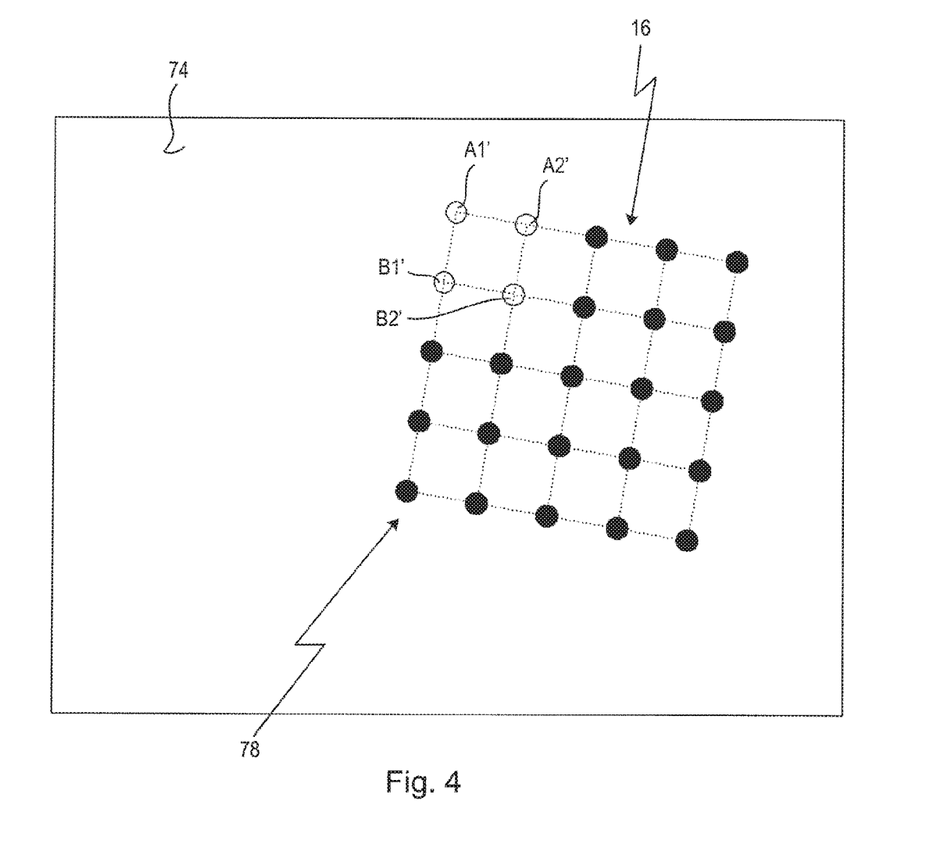
FIG. 4 shows a second calibration image which was recorded in the course of the calibration of the apparatus in FIG. 1.

Subsequently, at least one second calibration image is recorded using the cameras M, H and V, wherein the structural pattern 16 is projected by the projector 36 onto a planar surface at at least one second distance from the cameras M, H and V and from the projector 36, wherein the at least one second distance is greater or smaller than the first distance. FIG. 4 shows, by way of example, the recording of a second calibration image 78 using the camera M.

The planar surface in the recording of the calibration images is oriented perpendicular to the optical axes 30, 32 and 34.

It is also possible to record more than two calibration images at several different distances of the projected structural pattern 16.

The calibration images which were recorded with the cameras M, H and V are stored, for example, in the storage unit 60.

Figure 5:
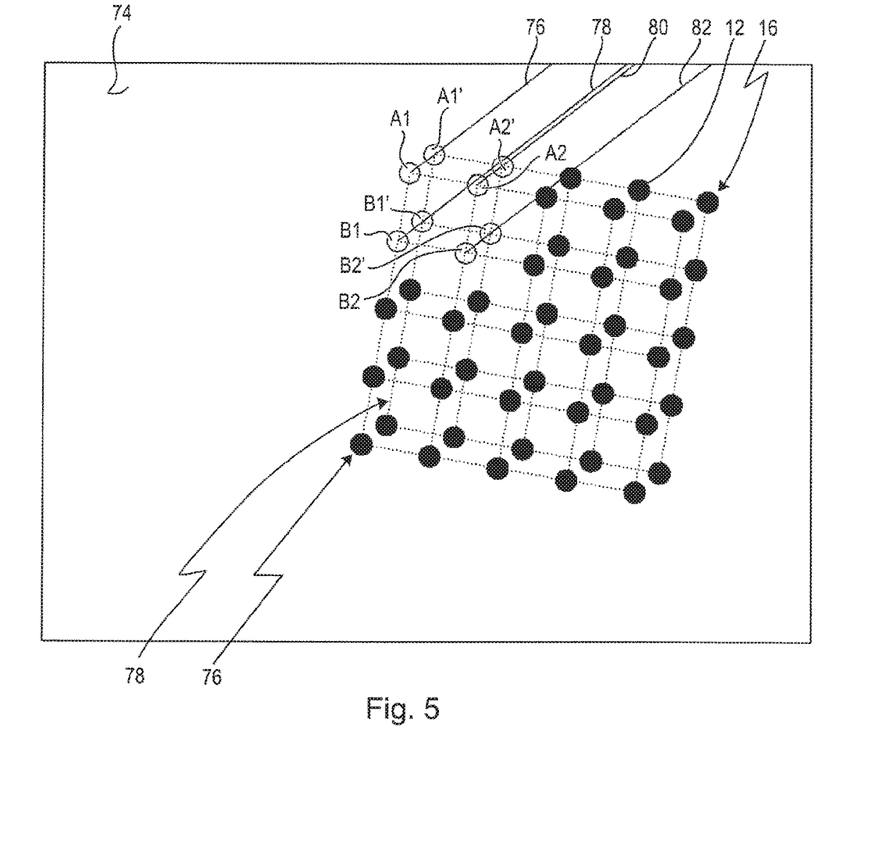
FIG. 5 shows a superposition of the two calibration images from FIGS. 3 and 4.

FIG. 5 shows the superposition of the two calibration images 76, 78, which were recorded with the camera M according to FIGS. 3 and 4. As already mentioned, the distance of the individual structural elements 12 among one another always remains the same in the calibration images of the cameras M, H and V despite the different distances of the projected structural pattern 16 from the cameras M, H and V.

FIG. 5 shows that the individual structural elements 12 in the calibration image 78 have moved with respect to the calibration image 76. From the calibration images, which are stored for example in the storage unit 60, according to FIGS. 3 and 4, calibration data is now obtained, for example by the calculation unit 62, that, for the individual structural elements 12, has in each case combinations of first parameters, which correlate the respective structural element 12 with the location and orientation of the camera M and of the projector 36, of second parameters, which correlate the respective structural element 12 with the location and orientation of the camera H and of the projector 36, and of third parameters, which correlate the respective structural element 12 with the location and orientation of the camera V and of the projector 36.

For further explanation of the calibration, by way of example four of the structural elements 12 are designated A1, A2, B1 and B2 in the calibration image 76 in FIG. 3, and the structural elements which are associated with the structural elements A1, A2, B1, B2 and are offset with respect to the camera image 76 are designated in the calibration image 78 in FIG. 4 with A1', A2', B1' and B2'.

If in each case a straight line is now placed through the pairs of associated structural elements A1, A1'; A2, A2'; B1, B1'; and B2, B2', this would give the straight lines 76, 78, 80, 82 according to FIG. 5.

Figure 6:
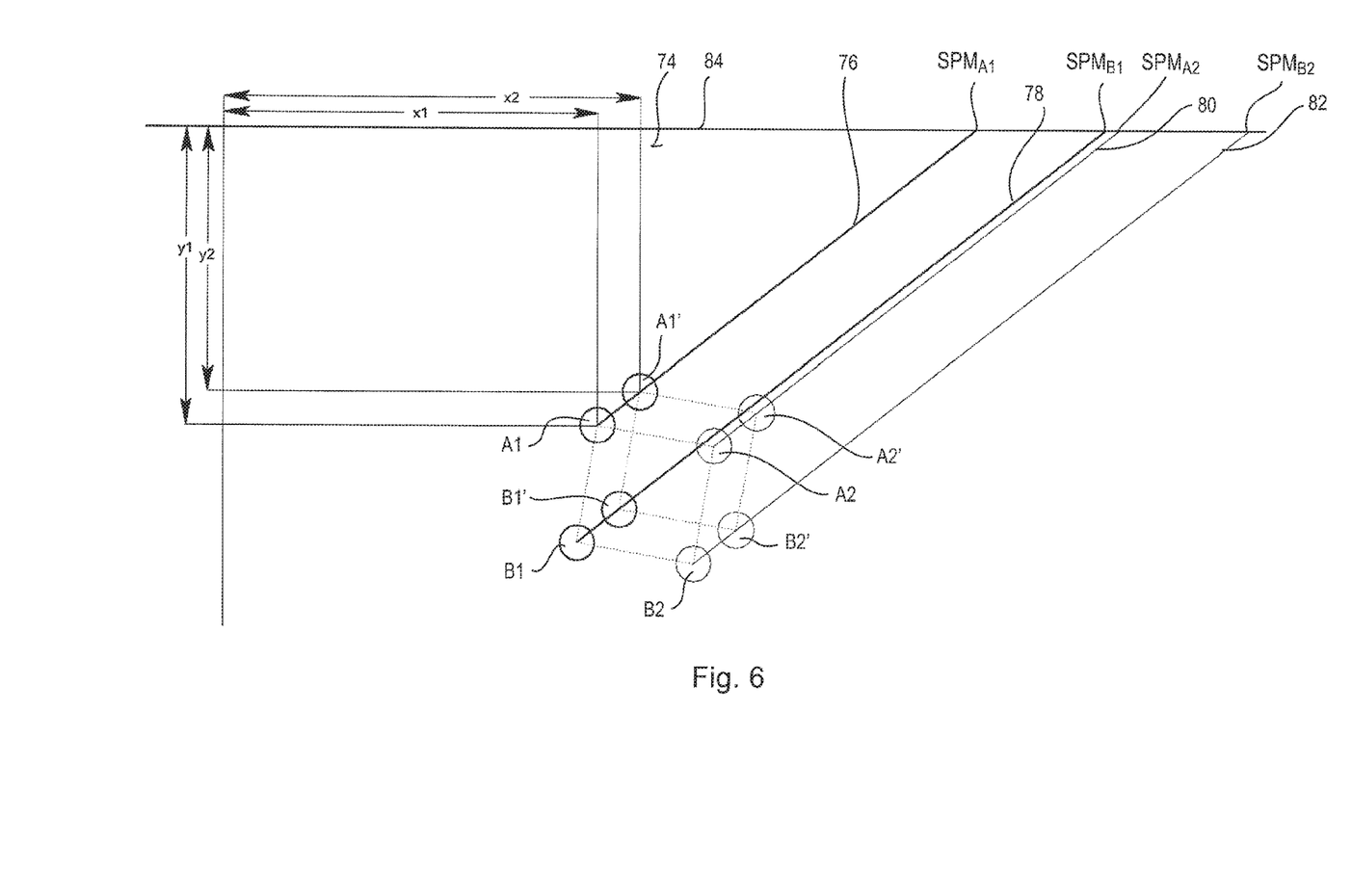
FIG. 6 shows an enlarged section of FIG. 5 for illustrating the manner with which calibration data can be obtained using the calibration images according to FIGS. 3 and 4.

FIG. 6 shows, at a larger scale for simplification, only the images of the structural elements A1, A1', A2, A2', B1, B1' and B2, B2' in the image plane 76 of the camera M. Likewise shown in FIG. 6 are the straight lines 76, 78, 80 and 82. The straight lines 76, 78, 80 and 82 are what are known as illumination epipolar lines. As can be seen from FIG. 6, all illumination epipolar lines 76, 78, 80, 82 are parallel with respect to one another, which is caused by the location of the projector 36, as it is preferred here, at the same height in the direction of the z-axis as the camera M. The illumination epipolar lines 76, 78, 80 and 82 thus have the same gradient StM, but differ in a respective point of intersection $SPM_{A1}$, $SPM_{B1}$, $SPM_{A2}$ and $SPM_{B2}$ with a reference axis 84 of the camera M. For example the first scanning line of the image sensor of the camera M is used as the reference axis 84.

As can be seen from FIG. 6, each imaged structural element A1, A2, 131, B2 is located always on the same illumination epipolar line 76, 78, 80 or 82, but its site on said illumination epipolar line depends on the distance of the respective projected structural element A1, A2, B1, B2 from the camera M, as is illustrated by the offset structural elements A1', A2', B1' and B2'. Furthermore located on the respective illumination epipolar line in relation to the respective structural element A1, A2, B1, B2 is not only the image thereof in the camera M, but also the structural element that is projected into the scene (or onto the planar surface during calibration) itself.

Furthermore, due to the location and orientation of the camera M and of the projector 36 at the same height in the direction of the z-axis and the parallel optical axes 30 and 40 (FIG. 1) thereof, the illumination epipolar lines 76, 78, 80 and 82 are parallel to the straight connecting line 37 (FIG. 1) of the camera M and of the projector 36.

While FIG. 6 shows by way of example four illumination epipolar lines 76, 78, 80, 82 for the structural elements A1, A2, B1, B2, it is to be understood that an illumination epipolar line with respect to the camera M is associated with each of the structural elements 12 of the structural pattern 16.

Corresponding conditions apply to the respective structural elements 12 with respect to the camera H and the camera V. One illumination epipolar line, which is related to the camera H, and one illumination epipolar line, which is related to the camera V, is associated with each structural element 12 of the projected structural pattern 16. The illumination epipolar lines which are related to the camera H are in turn mutually parallel and parallel to the straight connecting line 39 (FIG. 1), and the illumination epipolar lines which are related to the camera V are likewise mutually parallel and parallel to the straight connecting line 41 (FIG. 1).

Furthermore, the illumination epipolar lines which are related to the camera H have in each case a point of intersection SPH with a reference axis, for example the first scanning line of the camera H, and the illumination epipolar lines which are related to the camera V likewise have in each case one point of intersection SPH with a reference axis, for example the first scan line of the camera V.

By way of example, according to FIG. 6, the following equation applies to the point of intersection $SPM_A$, of the illumination epipolar line 76 to the structural element A1 with the reference axis 84 of the camera M:

$$SPM_{A1} = x1 - (y1*(x2-x1)/(y2-y1)).$$

For the gradient StM of this illumination epipolar line to the structural element A1, the following applies:

$$StM = (y1-y2)/(x1-x2).$$

As already mentioned, StM is identical for all illumination epipolar lines.

Similarly, the points of intersection SPH and the gradients StH of the illumination epipolar lines which are related to the camera H and the points of intersection SPV and gradients StV of the illumination epipolar lines which are related to the camera V can be calculated from the calibration images which were recorded with the cameras H and V.

Were the projector 36 to have a distance from the cameras M, H and V in the direction of the z-axis in FIG. 1, the illumination epipolar lines which are related to the respective camera M, H or V would not be mutually parallel, but have different gradients, but would always start at the same structural element.

For each of the structural elements 12 of the projected structural pattern 16, the calculated parameters SPM, SPH and SPV are stored in the storage unit 60. Likewise, the gradients StM, StH and StV are stored in the storage unit 60, wherein only in each case one value is obtained for the gradients StM, StH and StV in the exemplary embodiment which is preferred here.

Preferably all structural elements 12 of the projected structural pattern 16 with the associated parameters SPM, SPH and SPV and the parameters StM, StH and StV are stored in the storage unit 60 in the form of a calibration list. Here, each structural element 12 is described uniquely by the individual combination of SPM, SPH and SPV.

Figure 7:
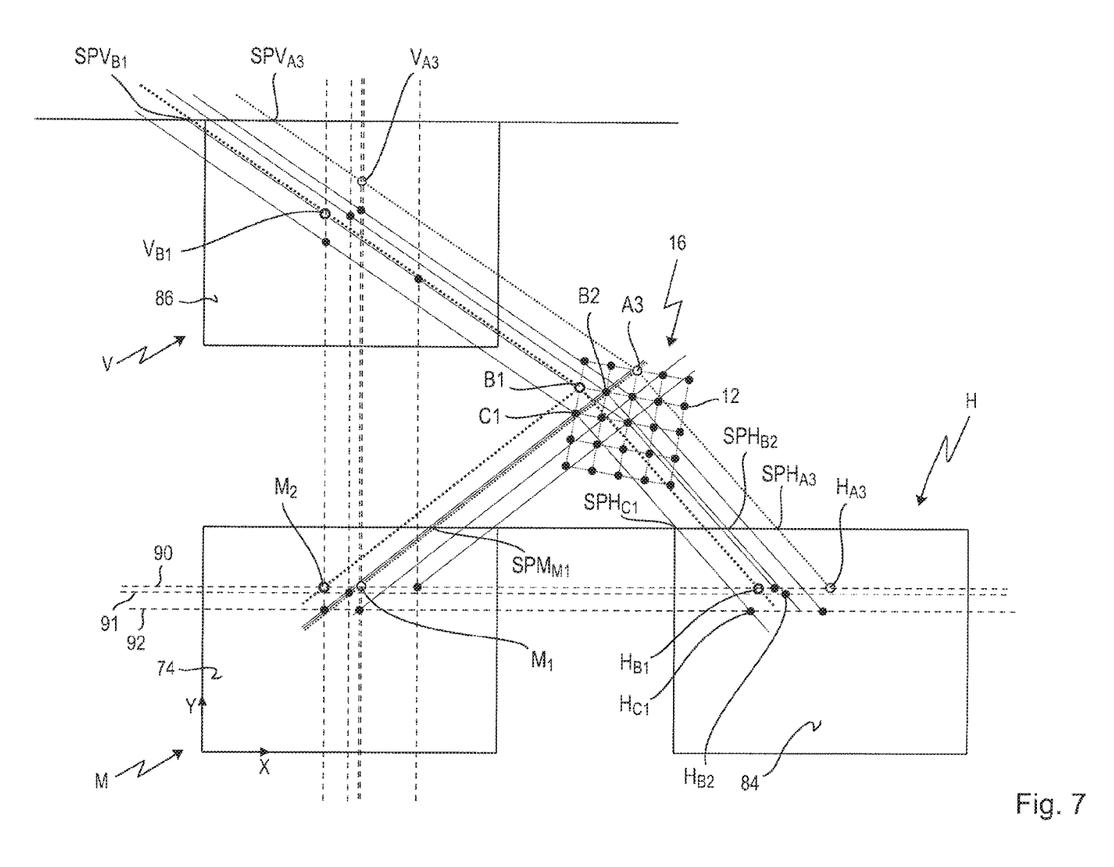
FIG. 7 shows a scheme for illustrating how structural elements of the projected structural pattern can be identified in the camera images.

There now follows a description with respect to FIG. 7 as to how the individual structural elements 12 of the structural pattern 16 which is projected into the scene 14 according to FIG. 1 can be identified in the camera images of the cameras M, H and V with the previously described calibration data, or in other words, how the structural elements 12 imaged in the cameras M, H and V can be associated uniquely with the projected structural elements 12.

FIG. 7 shows, in a planar projection illustration, the projected structural pattern 16, and likewise the image surface 74 of the camera M, an image surface 84 of the camera H, and an image surface 86 of the camera V.

A description follows, by way of example, as to how a structural element $M_1$, which is imaged in the image surface 74 of the camera M, can be reliably identified, that is to say can be uniquely associated with one of the projected structural elements 12.

First, the pixel coordinates $M_x$ and $M_y$ of the imaged structural element $M_1$ in the image surface 74 are determined. In practice, this is possible only to a specific accuracy, such that the true position of the structural element $M_1$ lies within a tolerance band.

Initially, a straight line, which is the illumination epipolar line on which the structural element $M_{xy}$ is located is calculated from the pixel coordinates $M_x$ and $M_y$ using the calculation unit 62:

$$SPM_{M1} = M_x - (M_y / StM)$$

The gradient StM is, as already explained above, the same for all illumination epipolar lines which belong to the camera M and therefore stored in the storage unit 60 and can be easily read therefrom. As a result, $SPM_{M1}$, that is to say the point of intersection of the illumination epipolar lines on which the structural element $M_1$ is located can be calculated in a simple manner.

Due to the determination of the pixel coordinates $M_x$ and $M_y$ not being possible exactly, $SPM_{M1}$ lies within a tolerance band.

Next, all structural elements 12 of the projected structural pattern 16 with which, in the calibration list that is stored in the storage unit 60, a respective SPM is associated that is located within the tolerance band of the value of $SPM_{M1}$ are now read from the calibration list.

As can be seen from FIG. 7, the illumination epipolar line on which the imaged structural element $M_1$ is located is very close next to two more illumination epipolar lines, which in each case have an SPM that is within the tolerance band of the calculated value $SPM_{M1}$.

Within the tolerance band of the parameter $SPM_{M1}$, possible candidate structural elements of the projected structural pattern 16 for the association with the imaged structural element $M_1$ are the structural elements C1, B2 and A3, which are all located on a respective illumination epipolar line with an SPM within the tolerance band of $SPM_{M1}$. The structural elements C1, B2, A3 are read from the calibration list including their associated parameters $SPH_{C1}$, $SPH_{B2}$, $SPH_{A3}$, $SPV_{C1}$, $SPV_{B2}$, $SPV_{A3}$, which all differ.

For each of the structural elements C1, B2 and A3, it is now possible for the calculation unit 62 to calculate where and on which camera epipolar line it would be located in the image of the camera H and in the image of the camera V.

Owing to the location and orientation of the cameras M and H, preferred here, at the same height with parallel optical axes, the camera epipolar lines of the camera M and the camera H, of which FIG. 7 shows three by way of example using interrupted lines 90, 91, 92, are aligned and mutually parallel. That structural element of the projected structural elements 12, in this case of the candidates C1, B2 or A3, whose image in the camera M is the imaged structural element $M_1$, is located in the image of the camera H on a camera epipolar line which has the same y-value $H_y$ as the camera epipolar line on which the imaged structural element $M_1$ in the image of the camera M lies, i.e.: $H_y = M_y$.

If one of the candidate structural elements C1, B2, A3 could be associated uniquely with the imaged structural element $M_1$, then for the relevant structural element C1, B2, A3, there must be an x-value on the camera epipolar line of the camera H with the y-value $H_y$, i.e. the equation:

$$H_x = SPH_{C1;B2;A3} + M_y / StH$$

must have a solution for $H_x$ for the relevant structural element C1, B2, A3. This calculation can likewise be performed by the calculation unit.

As can be seen from FIG. 7, there is a solution for $H_x$ for the structural element A3, while the previously mentioned equation is not met for the structural elements C1 and B2. As can be seen from FIG. 7, the image $H_{C1}$ of the structural element C1 in the image of the camera H is located on a different camera epipolar line than the structural element $M_1$ to be identified, specifically on the camera epipolar line 92, and the image $H_{B2}$ of the projected structural element B2 is also located in the image of the camera H on a different camera epipolar line than the imaged structural element $M_1$ to be identified, specifically on the camera epipolar line 91. Only $M_1$ and the image $H_{A3}$ of A3 are located in the image of the camera M on the same camera epipolar line 90.

As a result, only the image $H_{A3}$ of the structural element A3 in the camera H can be associated one-to-one with the image $M_1$ in the image of the camera M, wherein it is possible to verify this with the equation $$M_x = SPM_{A3} + M_y / StM.$$

$SPM_{A3}$ is here already known from the calibration list.

It is thus the projected structural element A3 which can be uniquely associated with the image $M_1$ in the image of the camera M. The reverse is also true for the image $H_{A3}$ in the image of the camera H.

A further exemplary structural element to be identified in the image of the camera M is designated $M_2$. Using the same procedure as described in respect of the image $M_1$, the result is that the image $H_{B1}$ of the structural element B1 can be associated one-to-one with the structural element $M_2$ in the image of the camera M.

The image of the structural element A3 in the camera V is designated in FIG. 7 with $V_{A3}$, and the image of the structural element B1 in the camera V is designated with $V_{B1}$. The third camera V is not mandatory for the described method, but optionally present. The third camera V can be used for further verification of the one-to-one association of structural elements in the images of the cameras M and H. It is useful in particular if a structural element 12 is not visible in one of the cameras M, H, for example if it is blocked by a shoulder or an edge, wherein the unique association of this structural element with the camera V in connection with that camera of the cameras M and H that can see the relevant structural element is possible. A third camera is also helpful if one of the cameras looks upon a surface in the scene 14 in a grazing manner.

After the individual structural elements 12 of the projected structural pattern 16 in the images of the cameras M, H and/or V have been reliably identified, distance determinations for the projected structural elements 12 can be performed which result in a correct distance. Erroneous switching-off of a monitored machine and dangerous situations can be avoided by the previously described method.

To increase contrast of the images of the structural elements 12 in the cameras M, H and V, provision may additionally be made for the projector 36 to transmit the structural pattern 16 in a pulsed fashion having a pulse frequency which corresponds to half the image recording frequency of the cameras M, H and V, wherein in each case two sequential images which are picked up by the cameras M, H and V are subtracted from one another. This effectively leaves in the camera images M, H and V only the images of the structural elements 12, while the scene 14 itself and the objects located therein cannot be seen in the camera images.

It is to be understood that the present invention is not limited to the exemplary embodiment described above. The function of the method according to the invention and of the apparatus according to the invention is accordingly not limited to the fact that the cameras M, H and V are arranged with their entrance pupils at the same height, and/or that the projector 36 is likewise arranged with its exit pupil in this plane. It is also not necessary for the optical axes of the cameras M, H and V and that of the projector 36 to be mutually parallel. In addition, instead of a periodic structural pattern, a non-periodic structural pattern or a structural pattern with random distribution can be used.

What is claimed is:

1. A method of identifying in camera images individual structural elements of a structural pattern projected onto a scene, comprising the steps of:
    projecting the structural pattern onto the scene using a projector,
    picking up the structural pattern projected onto the scene using a first camera and at least one second camera,
    wherein the first camera and the at least one second camera are positioned at a distance from one another, and wherein the projector is positioned outside a straight connecting line of the first camera and the at least one second camera and at a distance from the first camera and from the at least one second camera,
    determining, with respect to a structural element that is to be identified in a camera image of the first camera, that structural element in a camera image of the at least one second camera which can be associated one-to-one with the structural element that is to be identified in the camera image of the first camera,
    wherein the step of determining comprises using calibration data obtained by way of recording calibration images of the structural pattern projected by the projector and using the first camera and the at least one second camera,
    wherein the calibration data has, in relation to the individual structural elements, respective combinations of first parameters correlating the individual structural elements with a location and orientation of the first camera and of the projector, and of at least second parameters correlating the individual structural elements with a location and orientation of the at least one second camera and of the projector, wherein the first parameters for the individual structural elements comprise gradients and points of intersection with a first reference axis of first illumination epipolar lines related to the first camera, and the at least one second parameters for the individual structural elements comprise gradients and points of intersection with a second reference axis of second illumination epipolar lines related to the at least one second camera.

2. The method of claim 1, wherein the first reference axis is a scanning line of the first camera, and the second reference axis is a scanning line of the at least one second camera.

3. The method of claim 1, further comprising recording the calibration images, wherein the recording comprises projecting the structural pattern sequentially onto a first surface and onto a second surface, wherein the first and the second surfaces are spaced apart from one another in the transmission direction of the projector.

4. The method of claim 1, further comprising:
    determining pixel coordinates of the structural element to be identified in the camera image of the first camera,
    calculating at least a first parameter from the determined pixel coordinates and the calibration data,
    reading all structural elements which at least approximately satisfy the at least one first parameter from the calibration data,
    further reading from the calibration data at least one of the at least second parameters for each of said structural elements at least approximately satisfying the first parameter, and
    determining that structural element in the camera image of the at least one second camera that can be associated one-to-one with the structural element to be identified in the camera image of the first camera.

5. The method of claim 1, further comprising additionally picking up the structural pattern projected onto the scene using a third camera positioned outside a straight connecting line of the first camera and the at least one second camera and outside a straight connecting line of the first camera and the projector and outside a straight connecting line of the second camera and the projector, wherein the calibration data additionally has third parameters correlating the individual structural elements with a location and orientation of the third camera and of the projector.

6. The method of claim 1, wherein the structural elements are distributed uniformly over the structural pattern in two non-parallel main axes.

7. The method of claim 6, further comprising projecting the structural pattern onto the scene such that the two main axes of the structural pattern extend obliquely with respect to a straight connecting line of the first camera and the at least one second camera.

8. The method of claim 6, further comprising projecting the structural pattern onto the scene such that the two main axes of the structural pattern extend obliquely with respect to a straight connecting line of the projector and the first camera and the at least one second camera.

9. The method of claim 1, wherein the structural pattern is a dot pattern and the structural elements are dots.

10. The method of claim 1, further comprising projecting the structural pattern in pulsed fashion with a pulse frequency which corresponds to half an image recording frequency of the first camera and the at least one second camera, and subtracting in each case two sequential images from one another.

11. The method of claim 1, further comprising blocking ambient light in the camera images using an optical filter which is transmissive only in a wavelength range of projection light used for projecting the pattern onto the scene.

12. An apparatus for identifying in camera images structural elements of a structural pattern projected onto a scene, comprising:
    a projector configured to project the structural pattern onto the scene,
    a first camera for picking up the structural pattern projected onto the scene,
    at least one second camera for picking up the structural pattern projected onto the scene,
    wherein the first camera and the at least one second camera are positioned at a distance from one another, and wherein the projector is positioned outside a straight connecting line of the first camera and the at least one second camera and at a distance from the first camera and from the at least one second camera,
    a storage unit in which calibration data is stored,
    the calibration data having, in relation to the individual structural elements, respective combinations of first parameters correlating the individual structural elements with a location and orientation of the first camera and of the projector, and of at least second parameters correlating the individual structural elements with a location and orientation of the at least one second camera and of the projector, and a calculation unit configured to determine, using the calibration data, with respect to a structural element that is to be identified in a camera image of the first camera, that structural element in a camera image of the at least one second camera which can be associated one-to-one with the structural element that is to be identified in the camera image of the first camera, wherein the first parameters stored in the storage unit for the individual structural elements comprise gradients and points of intersection with a first reference axis of first illumination epipolar lines related to the first camera, and the at least second parameters for the individual structural elements comprise gradients and points of intersection with a second reference axis of second illumination epipolar lines related to the at least one second camera.

13. The apparatus of claim 12, wherein the calculation unit is configured:
to determine pixel coordinates of the structural element to be identified in the camera image of the first camera,
to calculate at least a first parameter from the pixel coordinates and the calibration data,
to read all structural elements which at least approximately satisfy the at least one first parameter from the calibration data,
to furthermore read from the calibration data at least one of the at least second parameters for each of said structural elements at least approximately satisfying the first parameter, and
to determine that structural element in the camera image of the at least one second camera that can be associated one-to-one with the structural element to be identified in the camera image of the first camera.

14. The apparatus of claim 12, wherein an entrance pupil of the first camera, an entrance pupil of the at least one second camera, and an exit pupil of the projector are located in one common plane.

15. The apparatus of claim 12, wherein an optical axis of the first camera, an optical axis of the at least one second camera, and an optical axis of the projector are mutually parallel.

16. The apparatus of claim 12, wherein a distance between the first camera and the at least one second camera differs from a distance between the projector and the first camera, and from a distance between the projector and the at least one second camera.

17. The apparatus of claim 12, furthermore comprising a third camera for picking up the structural pattern projected onto the scene, wherein the third camera is positioned outside a straight connecting line of the first camera and the second camera and outside a straight connecting line of the first camera and the projector, and outside a straight connecting line of the second camera and the projector, wherein the calibration data that is stored in the storage unit additionally has third parameters which correlate the individual structural elements with a location and orientation of the third camera and of the projector.

18. The apparatus of claim 12, wherein the projector is configured to generate the structural pattern in the form of a dot pattern.

19. The apparatus of claim 12, wherein the projector is configured to transmit the structural pattern in pulsed fashion having a pulse frequency which corresponds to half an image recording frequency of the first camera and the at least one second camera, and wherein the calculation unit is configured to subtract in each case two images which are picked up by the first camera and the at least one second camera from one another.

20. The apparatus of claim 12, further comprising an optical filter, which is transmissive only in a wavelength range of projection light used for projecting the structural pattern, wherein the optical filter is configured to block ambient light in the camera images.

21. The method of claim 1, further comprising monitoring a danger zone of a machine.

* * * * *

UNITED STATES PATENT AND TRADEMARK OFFICE
CERTIFICATE OF CORRECTION

PATENT NO. : 10,068,348 B2
APPLICATION NO. : 15/448922
DATED : September 4, 2018
INVENTOR(S) : Wendler Page 1 of 1

It is certified that error appears in the above-identified patent and that said Letters Patent is hereby corrected as shown below:

On the Title Page

Item (54) and in the Specification, Column 1, Line 2, Title, "INDENTIFYING" should be
--IDENTIFYING--

Signed and Sealed this
Twenty-sixth Day of February, 2019

Andrei Iancu
*Director of the United States Patent and Trademark Office*